US011938097B2

(12) United States Patent
Clark et al.

(10) Patent No.: US 11,938,097 B2
(45) Date of Patent: Mar. 26, 2024

(54) BOTTLE

(71) Applicant: Bottle Go Pty Ltd, Cardup (AU)

(72) Inventors: Brendan Paul James Richard Clark, South Perth (AU); Adam Brand, South Perth (AU); Michael Barton Longman, South Perth (AU); Edward Joseph Khoury, South Perth (AU)

(73) Assignee: BOTTLE GO PTY LTD, Cardup (AU)

( * ) Notice: Subject to any disclaimer, the term of this patent is extended or adjusted under 35 U.S.C. 154(b) by 259 days.

(21) Appl. No.: 16/468,892

(22) PCT Filed: Dec. 13, 2017

(86) PCT No.: PCT/AU2017/051383
§ 371 (c)(1),
(2) Date: Jun. 12, 2019

(87) PCT Pub. No.: WO2018/107227
PCT Pub. Date: Jun. 21, 2018

(65) Prior Publication Data

US 2020/0078270 A1 Mar. 12, 2020

(30) Foreign Application Priority Data

Dec. 13, 2016 (AU) ................................ 2016905150

(51) Int. Cl.
*B65D 81/32* (2006.01)
*A61J 9/00* (2006.01)
*A61J 11/00* (2006.01)

(52) U.S. Cl.
CPC ............. *A61J 9/008* (2013.01); *A61J 11/008* (2013.01); *A61J 11/0095* (2013.01); *B65D 81/3222* (2013.01)

(58) Field of Classification Search
CPC ...... A61J 9/008; A61J 11/0075; A61J 11/009; A61J 1/2093; A61J 11/0095; B65D 81/3222; B65D 81/3233; B65D 81/3261; B65D 81/3288; B65D 81/3283; B65D 81/3266
See application file for complete search history.

(56) References Cited

U.S. PATENT DOCUMENTS 4,386,696 A * 6/1983 Goncalves ......... B65D 51/2871 206/221
5,419,445 A 5/1995 Kaesemeyer
(Continued)

FOREIGN PATENT DOCUMENTS

GB 2523797 9/2015
WO WO03093130 * 7/2002 ............. B65D 51/08
(Continued)

*Primary Examiner* — Anthony D Stashick
*Assistant Examiner* — Raven Collins
(74) *Attorney, Agent, or Firm* — KOLITCH ROMANO DASCENZO GATES LLC

(57) ABSTRACT

A bottle comprises a body having an opening in an upper end for receiving fluid; a membrane provided to seal across the opening; and a receptacle sealingly secured to a surface of the membrane within the body. Separation of the membrane from the opening in the receptacle releases the receptacle such that the contents of the receptacle are released into the body.

13 Claims, 9 Drawing Sheets

(56) References Cited

U.S. PATENT DOCUMENTS

| | | | |
|---|---|---|---|
| 6,737,091 | B1 | 5/2004 | Littell, II |
| 7,469,804 | B2 * | 12/2008 | Thiebaut ............ B65D 83/0083 132/293 |
| 8,720,680 | B2 * | 5/2014 | Casey ....................... B65B 7/28 53/443 |
| 10,479,571 | B2 * | 11/2019 | Lanagan ............ B65D 51/2885 |
| 2005/0056608 | A1 | 3/2005 | Nesin |
| 2016/0096673 | A1 | 4/2016 | Leibovitch |

FOREIGN PATENT DOCUMENTS

| | | |
|---|---|---|
| WO | WO 2010/010548 | 1/2010 |
| WO | WO 2014/018603 | 1/2014 |

* cited by examiner

BOTTLE

FIELD OF THE INVENTION

The present invention relates to a bottle for feeding babies.

BACKGROUND TO THE INVENTION

Babies are commonly fed formula from bottles. The process of preparing formula in a bottle generally comprises properly sterilising the bottle, adding water and an appropriate amount of formula into the bottle, applying the screw-on lid having a teat and then shaking the bottle to mix the water and formula together.

When travelling with children, it is necessary to either mix the formula before leaving and then keep the bottle at an appropriate temperature until needed, or to take the bottle and formula separately and then mix as required. In circumstances such as travelling, it would be advantageous to have a means of easily mixing water with a predetermined amount of formula into an empty, sterile bottle.

SUMMARY OF THE INVENTION

According to one aspect of the present invention there is provided a bottle comprising:

- a body having an opening in an upper end for receiving fluid;
- a membrane provided to seal across the opening;
- a receptacle sealingly secured to a surface of the membrane within the body;
- wherein separation of the membrane from the opening in the receptacle releases the receptacle such that the contents of the receptacle are released into the body.

Preferably the body comprises a vessel having a narrowed neck portion and the receptacle comprises a cup having an aperture in an upper end such that the membrane seals across the neck and across the aperture in the receptacle.

In one embodiment, the receptacle includes arms to engage under a shoulder defined below the neck of the body to prevent the receptacle moving upwardly relative to the neck when the membrane is removed.

Preferably each of the arms comprises a flexible resilient member moveable to a compressed position in which the arm is located adjacent a side wall of the receptacle and the receptacle can be received inside of the neck, and wherein upon release of force from the arm, the arm moves to an expanded position in which the arm engages under the shoulder.

Preferably each of the arms comprises an elongate member having a first end secured to the side wall of the receptacle and a second end moveable between the compressed and expanded positions.

In one embodiment, each of the arms extends circumferentially around a portion of the outer surface of the side wall of the receptacle.

In a preferred embodiment, the receptacle comprises a cylindrical side wall defining the aperture and a lower end of the side wall is closed by a domed base wall.

According to another aspect of the present invention there is provided a bottle comprising:

- a body having an opening in an upper end for receiving fluid;
- a receptacle for holding contents and for locating within the body, the receptacle having an aperture;
- a membrane means for sealing across the opening of the body and for sealing closed the aperture of the receptacle;
- wherein the membrane is adapted such that upon separation of the membrane from the opening in the body the contents of the receptacle are released into the body.

In an embodiment the receptacle comprises retaining means for retaining the receptacle inside of the body when the membrane means is separated from the opening in the receptacle.

According to a further aspect of the present invention there is provided a method of preparing a bottle holding contents comprising:

- sealing a receptacle holding contents inside a body of bottle having an opening with a membrane, wherein the membrane seals across the opening of the body and seals closed the aperture of the receptacle;
- wherein the membrane seals such that when it is separated from the opening in the receptacle the contents are released from the receptacle into the body.

BRIEF DESCRIPTION OF THE DRAWINGS

In order to provide a better understanding, embodiments of the present invention will now be described, by way of example, with reference to the following drawings in which.

DETAILED DESCRIPTION OF PREFERRED EMBODIMENTS

Figure 1:
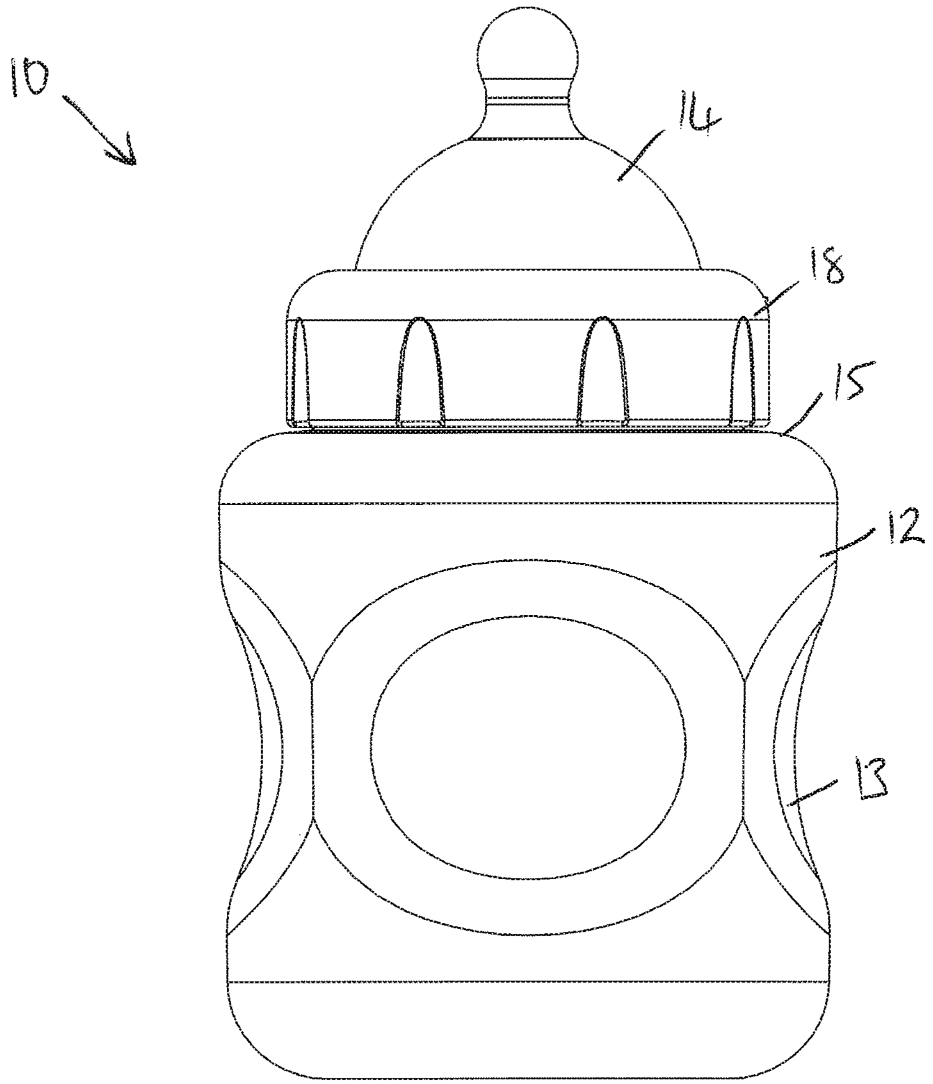
FIG. 1 is a front view of the bottle in accordance with the present invention.
Figure 2:
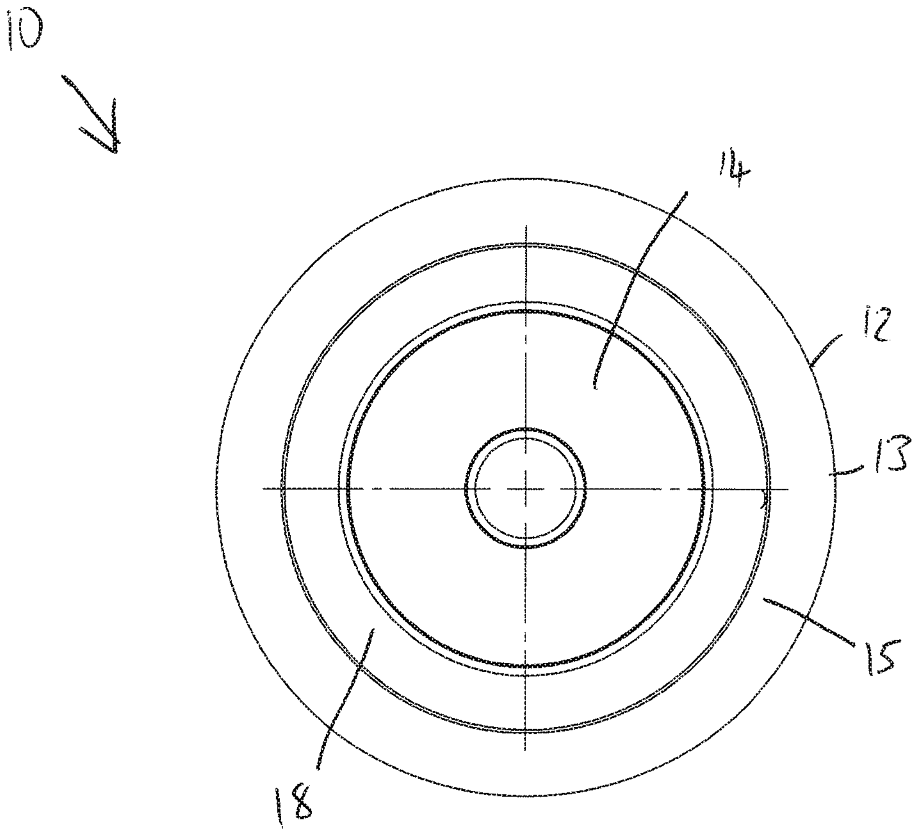
FIG. 2 is a top view of the bottle of FIG. 1.
Figure 3:
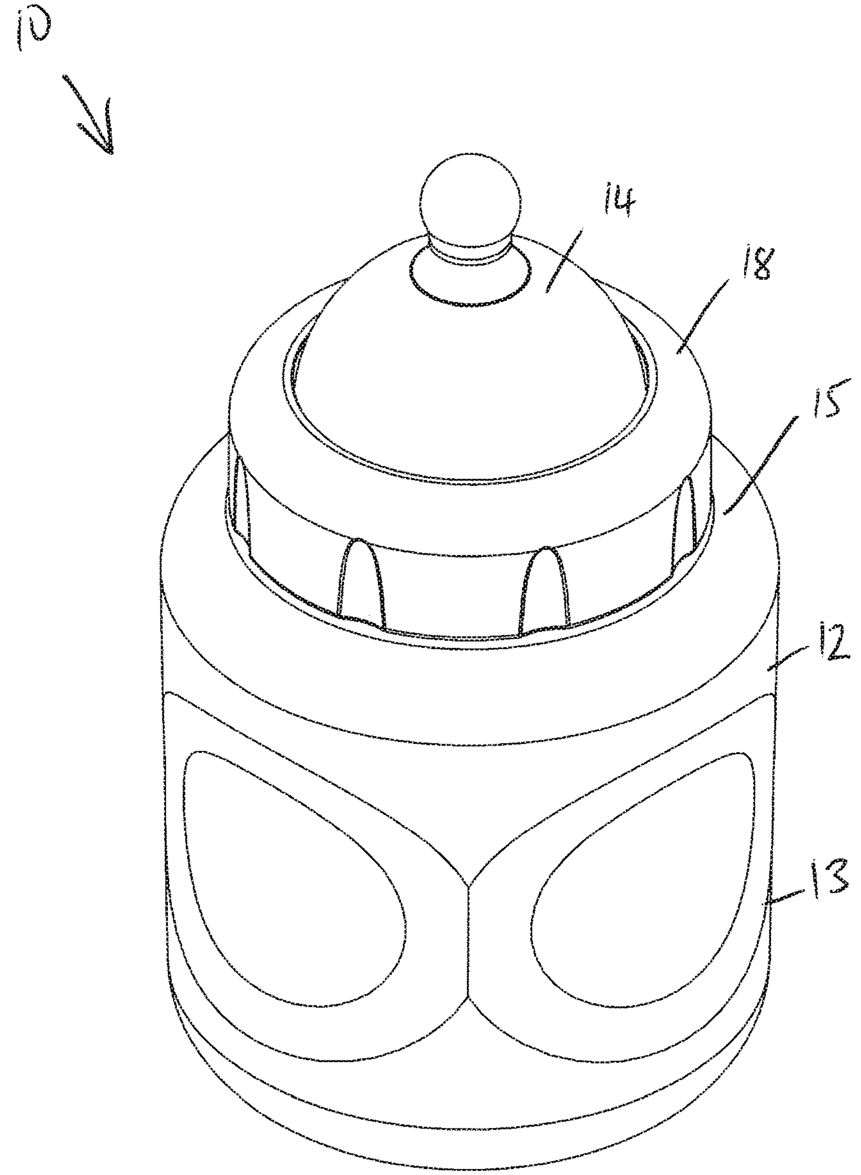
FIG. 3 is an upper perspective view of the bottle of FIG. 1.
Figure 4:
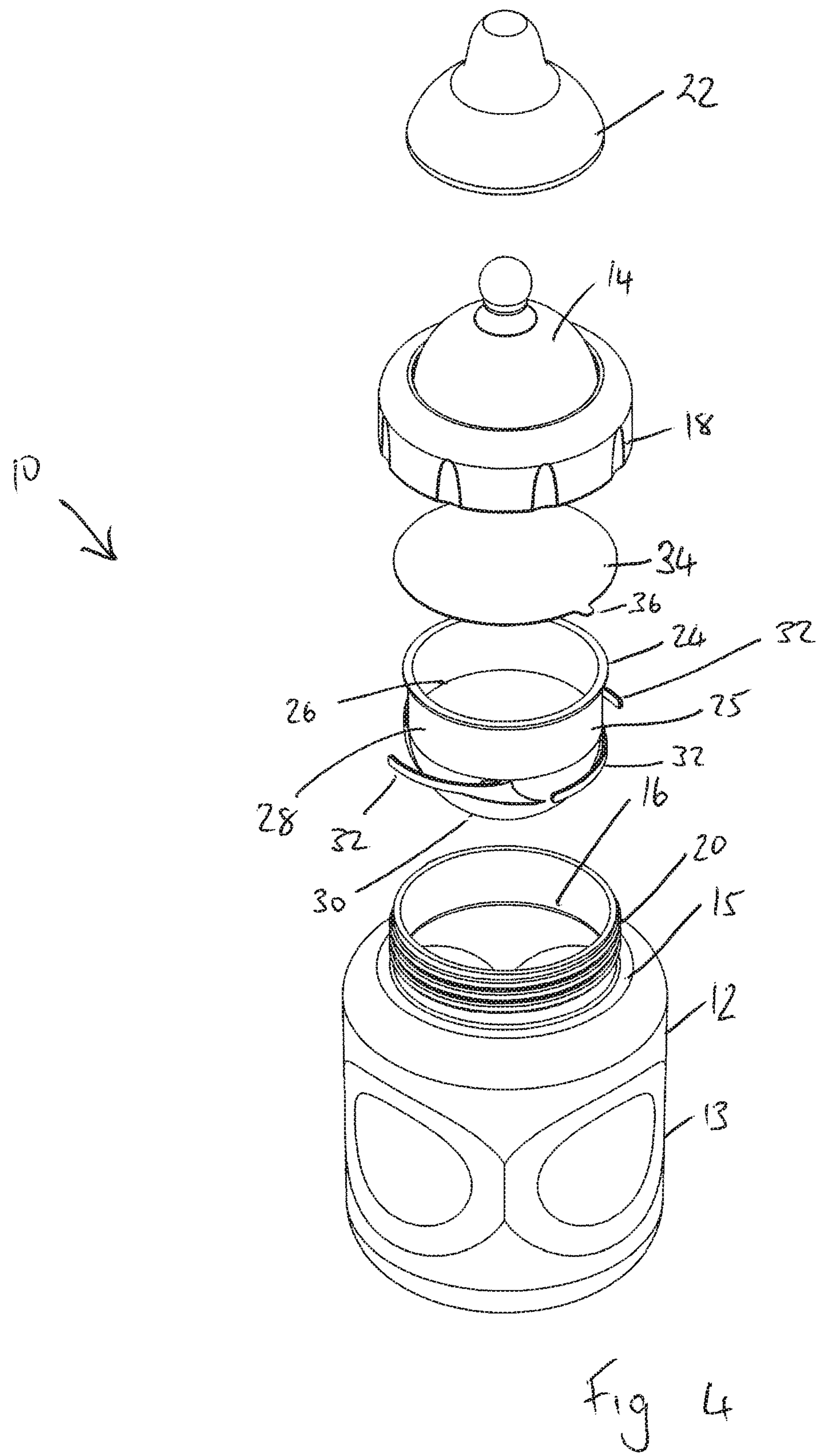
FIG. 4 is an exploded view of the bottle of FIG. 1.
Figure 5:
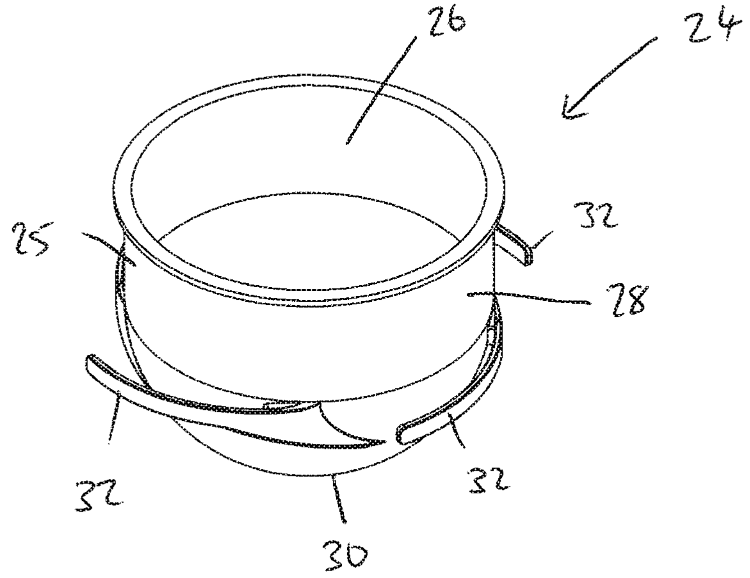
FIG. 5 is an upper perspective view of the receptacle of the bottle of FIG. 1.

Referring to the Figures, there is shown a bottle 10 comprising generally a body 12 and a teat 14. The body 12 comprises a cylindrical vessel 13 having an opening 16 in upper end thereof. The teat 14 is provided in conjunction with a collar 18 such that the teat 14 is fixable to a neck 20 of the body 12. The neck 20 includes an external thread and the collar 18 includes an internal thread such that the collar 18 may be screwed onto the neck 20 to seal across the opening 16 in a known manner.

The neck 20 has a smaller cross-sectional area than that of the cylindrical vessel 13 such that a shoulder 15 is defined between the neck 20 and the cylindrical vessel 13.

The bottle 10 may also be provided with a cover 22 which may be engaged across an upper surface of the teat 14. The bottle 10 may be used to receive formula for feeding to an infant in a known manner.

The bottle 10 is provided also with a receptacle 24. The receptacle 24 in the embodiment shown comprises a cup 25 having an aperture 26 in an upper end thereof. The receptacle 24 therefore comprises a cylindrical side wall 28 defining the aperture 26 and a lower end of the side wall 28 is closed by a domed base wall 30.

The receptacle 24 is dimensioned such that when a longitudinal axis of the side wall 28 is coaxial with the longitudinal axis of the neck 20 of the body 12, the receptacle 24 may be received downwardly into the neck 20 with the aperture 26 uppermost.

The receptacle 24 includes one or more compressible arms 32 on an outer surface thereof. In the embodiment shown, each of the arms 32 comprises a flexible elongate member having a first end secured to the outer surface of the side wall 28 of the receptacle 24. Each of the arms 32 extends circumferentially around a portion of the outer surface of the side wall 28 of the receptacle 24. The second end of each of the arms 32 is located offset from the side wall 28 of the receptacle 24. Each of the arms 32 is flexible and resilient such that the arms 32 may be compressed towards the side wall 28 of the receptacle 24.

In the embodiment shown, there are three such arms 32 extending around the side wall 28 of the receptacle 24. The arms 32 may be moved to a compressed position such that the arms 32 are located adjacent the side wall 28. Upon release of force from the arms 32, the second ends of the arms 32 will move outwardly away from the side wall 28 to an expanded position.

Figure 8:
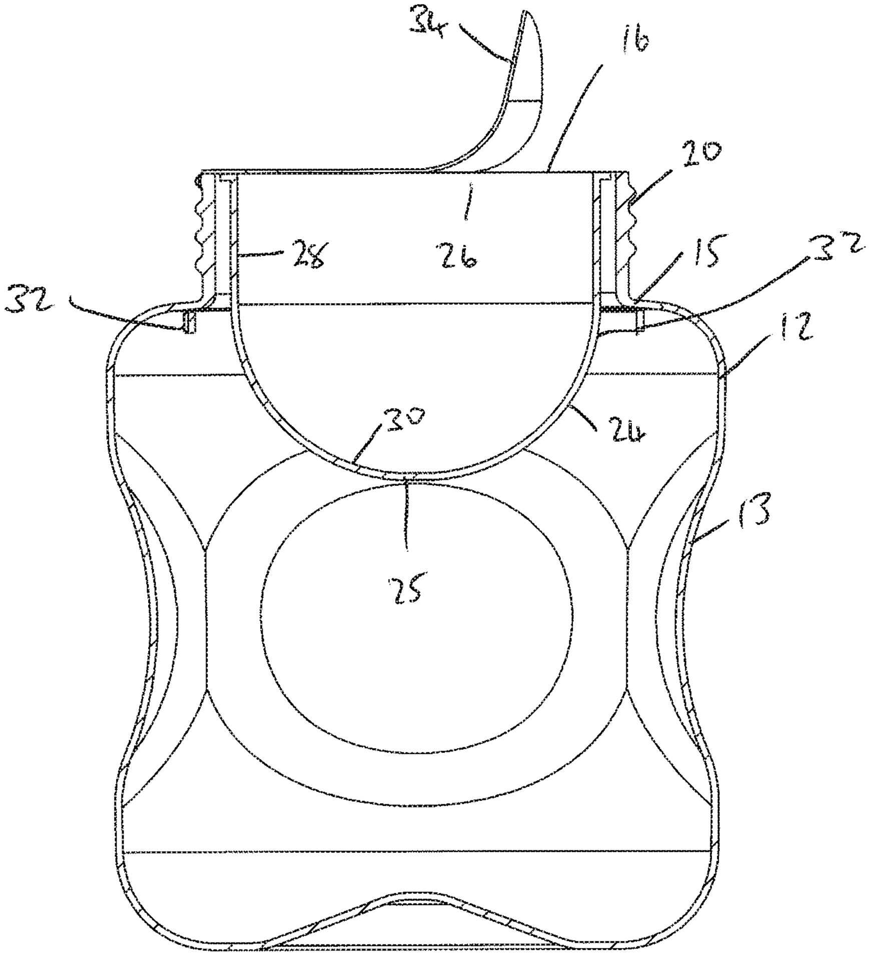
FIG. 8 is a side cross-sectional view of the body of the bottle showing removal of the membrane.

With the arms 32 in the compressed position, the receptacle 24 may be received downwardly into the opening 16 in the neck 20 of the body 12. The arms 32 are retained in the compressed position by engagement with an inner surface of the neck 20. As the receptacle 24 moves downwardly until the aperture 26 in the upper end thereof is aligned with the opening 16 in the neck 20, the arms 32 move below the shoulder 15 (as can be seen in FIG. 8) and then move back to the expanded position. The arms 32 thereby engage under the shoulder portion 15 and prevent the receptacle 24 being moved upwardly out of the neck 20. While the arms 32 are shown in the embodiment shown as flexible circumferential members, it will be appreciated that other embodiments would be possible, such as flexible ribs provided on the outside of the receptacle 24.

The bottle 10 includes also a membrane 34. The membrane 34 comprises a disc of a suitable sheet material which is secured across the opening 16 in the neck 20, preferably in an adhesive manner. The membrane 34 may comprise, for example, a disc of metallic foil.

The membrane 34 is secured around the upper edge of the neck 20 to seal across the opening 16. An upper edge of the aperture 26 of the receptacle 24 is secured to a lower surface of the membrane 34. In practice, it is expected that the membrane 34 will be attached across the aperture 26 of the receptacle 24 such that a peripheral edge portion of the membrane 34 extends beyond the receptacle 24. The receptacle 24 will then be placed into the neck 20 of the body 12 of the bottle 10 and the peripheral edge portion secured to the upper edge of the neck 20.

The receptacle 24 is provided for receiving a quantity of a powder, such as a powdered baby formula. The powder is sealed within the receptacle 24 by the membrane 34. When the membrane 34 is secured to the body 12, the receptacle 24 and contained powder is thereby sealed within the upper end of the body 12 of the bottle 10.

Figure 6:
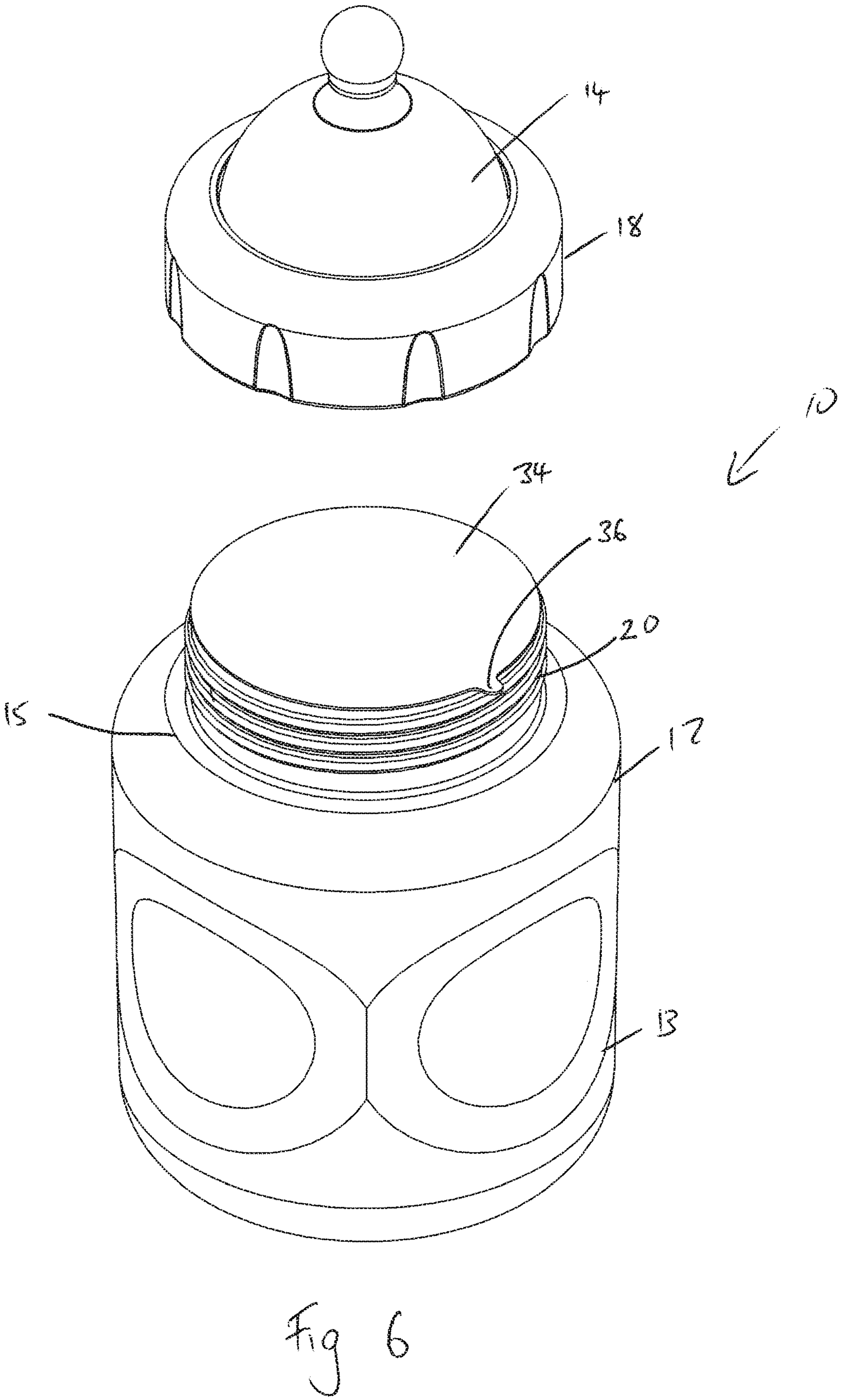
FIG. 6 is an upper perspective view of the bottle of FIG. 1 showing the collar and teat removed.
Figure 7:
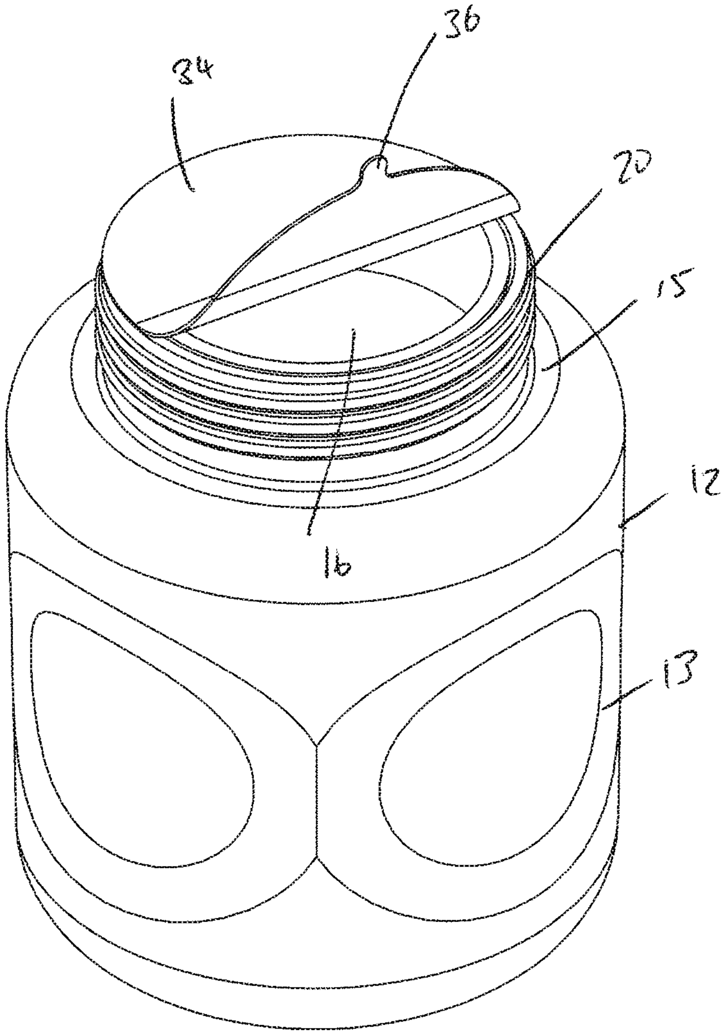
FIG. 7 is an upper perspective view of the body of the bottle showing removal of the membrane.

In use, the bottle 10 is provided in a sealed state and used as shown in FIGS. 6 to 9. The bottle 10 may be provided sterilised within a sealed container, such as a sealed plastic bag (not shown) and may be disposable. Water is also provided within the body 12 of the bottle 10 and is sealed in by the membrane 34. The bottle 10 is removed from the sealed container for use and the teat 14 and collar 18 removed as shown in FIG. 6. The membrane 34 is peeled away from the neck 20 as shown in FIGS. 7 and 8. A tab 36 may be provided extending outwardly from the periphery of the membrane 34 to aid in peeling of the membrane 34.

Figure 9:
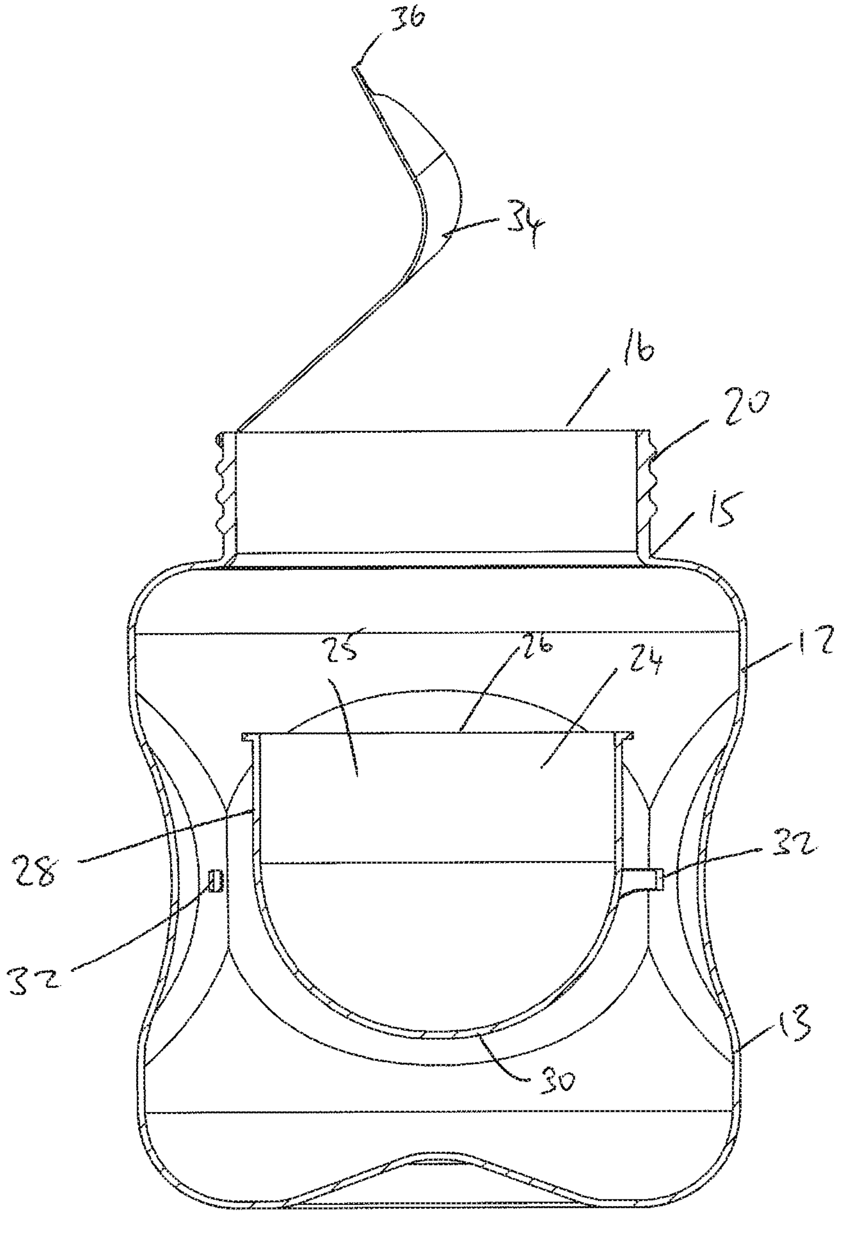
FIG. 9 is a side cross-sectional view showing complete removal of the membrane and release of the receptacle into the body.

As the membrane 34 is peeled away from the neck 20, the arms 32 engaging under the shoulder 15 retain the receptacle 24 in place and thereby allow the membrane 34 to be peeled away from the upper edge of the aperture 26 of the receptacle 24. As the membrane 34 is released from the receptacle 24, the receptacle 24 falls into the interior of the body 12 of the bottle 10 and also into the water, as can be seen in FIG. 9. The powder is mixed with the water by replacing the teat 14 and collar 18 and shaking the bottle 10 in the normal manner. The receptacle 24 within the body 12 acts as an agitator to improve mixing of the powder which has been released from the receptacle 24 into the body 12 of the bottle 10. Once mixed, the bottle 10 may be used to feed an infant in a known manner.

The bottle 10 of the present invention therefore provides a simple construction in which a predetermined amount of formula powder can be provided within a sterilised bottle. Opening of the bottle 10 releases the powder within the bottle such that is simply a matter of removing the membrane 34, screwing on the collar 15 with the teat 14, and shaking.

It will be readily apparent to persons skilled in the relevant arts that various modifications and improvements may be made to the foregoing embodiments, in addition to those already described, without departing from the basic inventive concepts of the present invention. In an alternative the body 12 need not be provided with water, which can be added after the membrane 34 is removed releasing the receptacle 24 and formula into the body 12.

The invention claimed is:

1. A bottle comprising:

a body having an opening in an upper end for receiving fluid;

a membrane provided to seal across the opening;

a receptacle sealingly secured to a surface of the membrane within the body;

wherein separation of the membrane from the opening of the body releases the receptacle such that the contents of the receptacle are released into the body;

wherein the body comprises a vessel having a narrowed neck portion and the receptacle comprises a cup having an aperture in an upper end such that the membrane seals across the neck and across the aperture in the receptacle, and wherein the receptacle includes arms to engage under a shoulder defined below the neck of the body to prevent the receptacle moving upwardly relative to the neck when the membrane is removed; and wherein the surface of the membrane comprises an adhesive in contact with the opening of the body and the receptacle, wherein the adhesive makes seals with the body and the receptacle, and further wherein the seals are configured to be broken when the surface of the membrane is removed from contact with the body and the receptacle.

2. A bottle in accordance with claim 1, wherein each of the arms comprises a flexible resilient member moveable to a compressed position in which the arm is located adjacent a side wall of the receptacle and the receptacle can be received inside of the neck, and wherein upon release of force from the arm, the arm moves to an expanded position in which the arm engages under the shoulder.

3. A bottle in accordance with claim 2, wherein each of the arms comprises an elongate member having a first end secured to the side wall of the receptacle and a second end moveable between the compressed position and the expanded position.

4. A bottle in accordance with claim 3, wherein each of the arms extends circumferentially around a portion of an outer surface of the side wall of the receptacle.

5. A bottle in accordance with claim 1, wherein the receptacle comprises a cylindrical side wall defining the aperture and a lower end of the side wall is closed by a domed base wall.

6. A bottle comprising:

a body having an opening in an upper end for receiving fluid;

a receptacle for holding contents and for locating within the body, the receptacle having an aperture;

a membrane means for sealing across the opening of the body and for sealing closed the aperture of the receptacle, wherein the membrane means includes a membrane with a surface, wherein the surface of the membrane comprises an adhesive in contact with the opening of the body and the receptacle, wherein the membrane means further comprises an adhesive that makes seals with the bottle and the receptacle, and further wherein the seals are configured to be broken when the surface of the membrane is removed from contact with the body and the receptacle;

wherein the membrane is adapted such that upon separation of the membrane from the opening in the body the contents of the receptacle are released into the body; and wherein the receptacle comprises retaining means for retaining the receptacle inside of the body when the membrane means is separated from the opening of the body.

7. A method of preparing a bottle holding contents, the method comprising:

sealing a receptacle holding contents inside a body of the bottle having an opening with a membrane, wherein the sealing includes using an adhesive to form a seal with the membrane across the opening of the body and to form a seal that seals closed an aperture of the receptacle, wherein the seals are configured to be broken when the membrane is removed from contact with the body and the receptacle;

wherein the membrane seals such that when it is separated from the opening of the body the contents are released from the receptacle into the body; and wherein arms of the receptacle are prevented from moving out of the body by engagement with a shoulder defined below a narrowed neck of the body.

8. A bottle in accordance with claim 1, wherein the receptacle is suspended in the body by the adhesive of the membrane.

9. A bottle in accordance with claim 1, wherein the membrane is configured to be peeled from the opening of the body, wherein when the membrane is removed from the body by being peeled from the body and the receptacle is prevented from moving upwardly relative to the neck, the membrane is further configured to be peeled from the aperture of the receptacle to release the contents of the receptacle into the body.

10. A bottle in accordance with claim 1, wherein the membrane comprises a disc of metallic foil.

11. A bottle in accordance with claim 6, wherein the receptacle is suspended in the body by the adhesive of the membrane.

12. A bottle in accordance with claim 6, wherein the membrane is configured to be peeled from the opening of the body, wherein when the membrane is removed from the body by being peeled from the body and the receptacle is prevented from moving upwardly relative to the neck, the membrane is further configured to be peeled from the aperture of the receptacle to release the contents of the receptacle into the body.

13. A bottle in accordance with claim 6, wherein the membrane comprises a disc of metallic foil.

* * * * *